(12) United States Patent
Takezawa et al.

(10) Patent No.: US 12,226,789 B2
(45) Date of Patent: Feb. 18, 2025

(54) NOZZLE HANGER

(71) Applicant: TATSUNO CORPORATION, Tokyo (JP)

(72) Inventors: Masahiro Takezawa, Tokyo (JP); Makoto Arai, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 932 days.

(21) Appl. No.: 16/963,472

(22) PCT Filed: Nov. 13, 2018

(86) PCT No.: PCT/JP2018/041987
§ 371 (c)(1),
(2) Date: Jul. 20, 2020

(87) PCT Pub. No.: WO2019/150700
PCT Pub. Date: Aug. 8, 2019

(65) Prior Publication Data
US 2020/0384493 A1  Dec. 10, 2020

(30) Foreign Application Priority Data

Feb. 5, 2018   (JP) ................................ 2018-018030

(51) Int. Cl.
*B05B 15/60*   (2018.01)
*F17C 5/06*   (2006.01)

(52) U.S. Cl.
CPC .............. *B05B 15/60* (2018.02); *F17C 5/06* (2013.01); *F17C 2205/0352* (2013.01); *F17C 2205/0376* (2013.01); *F17C 2221/012* (2013.01)

(58) Field of Classification Search
CPC .... B05B 15/60; F17C 5/06; F17C 2205/0352; F17C 2205/0376; F17C 2221/012; F17C 5/02; F17C 2223/036; F17C 2270/0139; B67D 7/42; B67D 7/06; Y02E 60/32; Y02P 90/45
USPC .................................................. 141/389, 392
See application file for complete search history.

(56) References Cited

FOREIGN PATENT DOCUMENTS

| JP | 2003034397 A | 2/2003 |
|---|---|---|
| JP | 2004019716 A | 1/2004 |
| JP | 2004231241 A | 8/2004 |

(Continued)

OTHER PUBLICATIONS

Microfilm of the specification and drawings annexed to the request of Japanese utility model application No. 045109/1980.

(Continued)

*Primary Examiner* — Frederick C Nicolas
*Assistant Examiner* — Robert K Nichols, II
(74) *Attorney, Agent, or Firm* — Stetina Brunda Garred & Brucker (57) ABSTRACT

A nozzle hanger 1 for hanging a filling nozzle 11, of which one end has a filling pipe 11a for filling a hydrogen gas and the other end has a grip section 11b, is provided with: an upper part 2 that holds the filling pipe of the filling nozzle; a lower part 3 that faces the upper part and holds the grip section of the filling nozzle; and an intermediate part 4 that connects the upper part and the lower part, wherein the lower part is provided with a fixed lock section (a recessed section 6, a stepped section 7) that locks the grip section of the filling nozzle in a fixed state, and the upper part is provided with a movable lock section 5 that contacts the filling pipe of the filling nozzle and locks the filling pipe in a movable state.

12 Claims, 6 Drawing Sheets

(56) References Cited

FOREIGN PATENT DOCUMENTS

| | | |
|---|---|---|
| JP | 2016080067 A | 5/2016 |
| WO | 2017203721 A1 | 11/2017 |

OTHER PUBLICATIONS

International Search Report for PCT/JP2018/041987; mailed Jan. 29, 2019.

NOZZLE HANGER

CROSS-REFERENCE TO RELATED APPLICATIONS

The present application claims priority to International Application No. PCT/JP2018/041987 filed on Nov. 13, 2018, which claims priority to Japanese Patent Application No. 2018-018030 filed on Feb. 5, 2018, the disclosures of which are incorporated herein by reference.

STATEMENT RE: FEDERALLY SPONSORED RESEARCH/DEVELOPMENT

Not Applicable

BACKGROUND

1. Technical Field of the Invention

The present invention relates to a nozzle hanger on which a hydrogen filling nozzle is hung in a hydrogen filling apparatus.

2. Description of the Related Art

In a hydrogen filling apparatus installed at a hydrogen station, a filling nozzle attached to an end of a filling hose is removed from a nozzle hanger of the hydrogen filling apparatus, and is connected to a filling port of a vehicle to fill a hydrogen gas in a hydrogen tank of the vehicle. In order to hang the filling nozzle on the nozzle hanger, for example, after inserting a lower end of the filling nozzle vertically into a hook with a depth of about 50 mm, an upper end of the filling nozzle is fixed with a hinge-shaped lid part.

When a high-pressure hydrogen gas, for example a 70 MPa hydrogen gas is tried to be filled rapidly in a hydrogen tank of a vehicle, adiabatic compression occurs, and temperature in the hydrogen tank of the vehicle increases. A method called pre-cool filling in which a hydrogen gas is cooled in advance and is filled has been carried out accordingly.

BRIEF SUMMARY

The above-mentioned conventional nozzle hanger is separately provided with a hook and a lid part, so that manufacturing errors and mounting errors of these members cause a hanging condition of the filling nozzle on the nozzle hanger to change, which may cause dropout of the filling nozzle from the nozzle hanger.

In addition, in order to hang the filling nozzle on the nozzle hanger, it is necessary to insert it to the hook and fix it with the lid part in two stages, so that it is desired to more easily and quickly hang the filling nozzle on the hanger.

Furthermore, in the conventional nozzle hanger, only a gap of one hand is left between the upper and lower members for holding the filling nozzle excluding the filling nozzle, so that a filler has to hang and remove the filling nozzle with one hand, which is a heavy burden for the filler.

Further, due to the above pre-cool filling, the filling nozzle connected to a filling port of a vehicle is cooled, and a movable part such as a lever or a fixed part such as a discharge pipe may freeze, which may make it impossible to remove the filling nozzle from the filling port of the vehicle, or to connect the filling nozzle to the filling port of the vehicle at the next filling.

The present invention has been made in consideration of the above problems in the conventional art, and the object thereof is to provide a nozzle hanger on which a filling nozzle can be easily, quickly, and reliably hung and removed, and which can also handle pre-cool filling.

In order to attain the above object, a nozzle hanger of the present invention for hanging a filling nozzle, of which one end has a filling pipe for filling a hydrogen gas and another end has a grip section is characterized by including: an upper part for holding the filling pipe of the filling nozzle; a lower part facing the upper part and holding the grip section of the filling nozzle; and an intermediate part for connecting the upper part and the lower part, wherein the lower part includes a fixed lock section for locking the grip section of the filling nozzle in a fixed state, and the upper part includes a movable lock section for contacting the filling pipe of the filling nozzle and locking the filling pipe in a movable state.

With the nozzle hanger of the present invention, the upper part, the lower part and the intermediate part are integrated as a single member, so that no manufacturing error nor mounting error of these parts generates, which makes a dimensional error between the filling nozzle and the nozzle hanger considerably small. With this, dropout of the filling nozzle from the nozzle hanger and the like can certainly be prevented. In addition, disposing the filling nozzle between the fixed lock section and the movable lock section only allows the filling nozzle to be held with the both lock sections, that is, the filling nozzle can be hooked on the nozzle hanger with one touch.

In the above nozzle hanger, the movable lock section may include biasing means for biasing the filling pipe downward when the filling nozzle is hung on the nozzle hanger. With this, dropout of the filling nozzle from the nozzle hanger can be prevented more certainly.

Further, the movable lock section can be formed in a spherical shape that protrudes downward, and a gas outlet can be provided in a central region thereof. With this, dropout of the filling nozzle, in which an end of the discharge pipe is depressed in a spherical shape, from the nozzle hanger can be prevented more certainly, and frozen water droplets and others due to pre-cool filling or the like can be removed with a gas (compressed air, inert gas) injected from the injection hole. Further, injecting the gas while biasing the discharge pipe downward by the biasing means, the gas can be injected without causing leakage at a predetermined portion.

Moreover, a gap more than a predetermined size may be formed between the intermediate part and a side face of the filling nozzle when the filling nozzle is hung on the nozzle hanger. With this, for instance, a user is able to carry out hanging and removing of the filling nozzle while holding it with both hands.

The fixed lock section can include a recessed section in which the grip section of the filling nozzle is accommodated, and a stepped section projecting upward from the recessed section and locking the grip section. With this simple construction, dropout of the filling nozzle from the nozzle hanger can further certainly be prevented.

As described above, with the present invention, it becomes possible to provide a nozzle hanger on which a filling nozzle can be easily, quickly, and reliably hung and removed, and which can also handle pre-cool filling.

BRIEF DESCRIPTION OF THE DRAWINGS

FIG. 2(a) is a perspective view as viewed obliquely from the upper left.

FIG. 6(a) is a perspective view as viewed obliquely from the upper left.

DETAILED DESCRIPTION

Hereinafter, embodiments of the present invention will be explained with reference to the attached drawings.

Figure 1A:
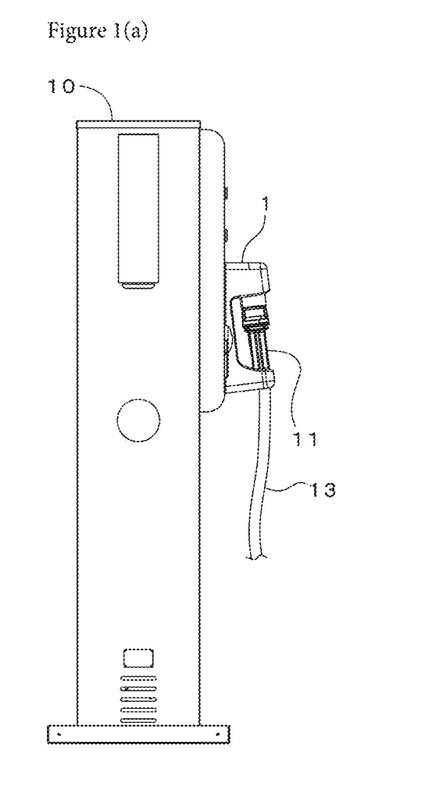
FIGS. 1(a), 1(b) and 1(c) are front, left side and right side views, respectively, of an example of a gas filling apparatus with a nozzle hanger according to the present invention.
Figure 1B:
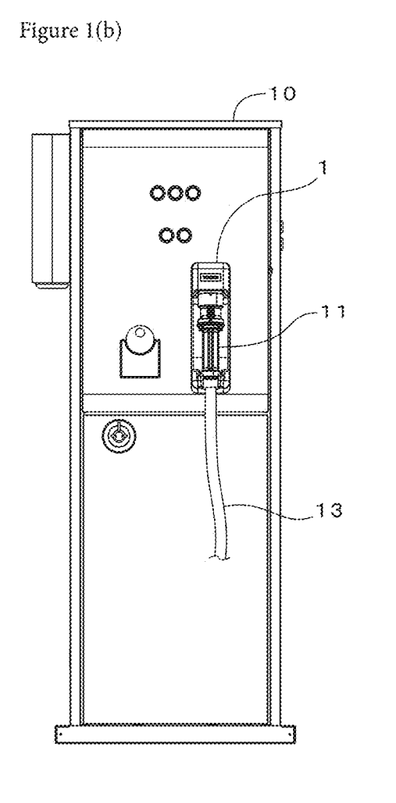
Figure 1C:
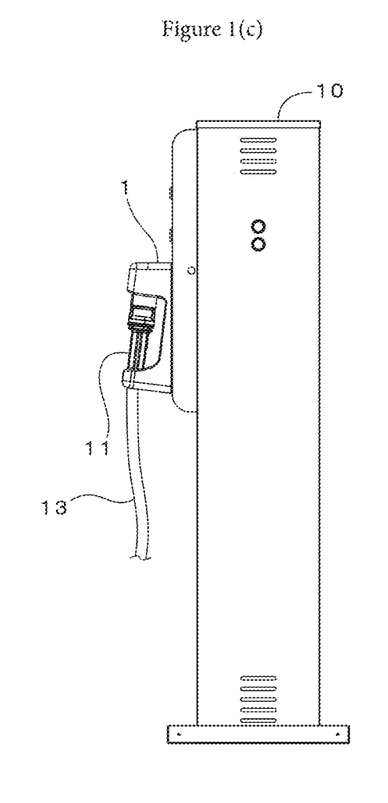

FIGS. 1(a), 1(b) and 1(c) show an example of a gas filling apparatus with a nozzle hanger according to the present invention, the nozzle hanger 1 of the present invention is mounted at a central portion on the front of the gas filling apparatus 10. The figure shows a condition that a filling nozzle 11 attached to an end portion of a filling hose 13 is hung on the nozzle hanger 1.

Figure 2A:
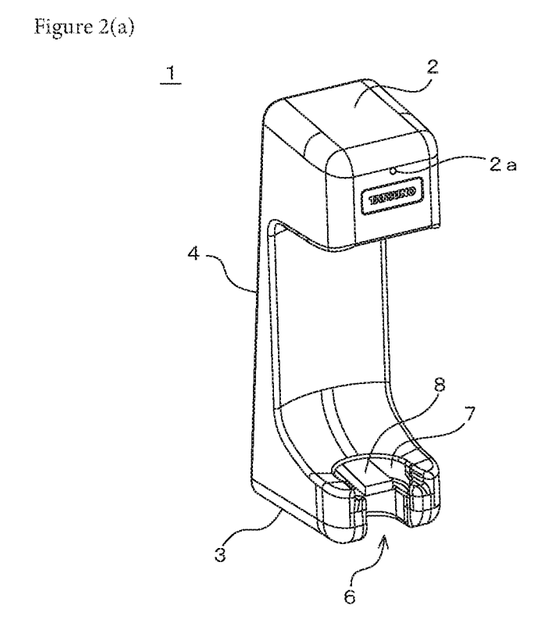
Figure 2B:
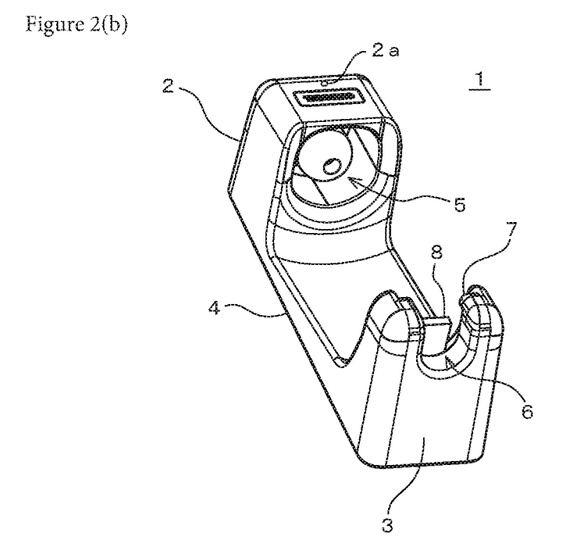
FIG. 2(b) is a perspective view as viewed obliquely from the lower left, of a nozzle hanger according to the first embodiment of the present invention.
Figure 3:
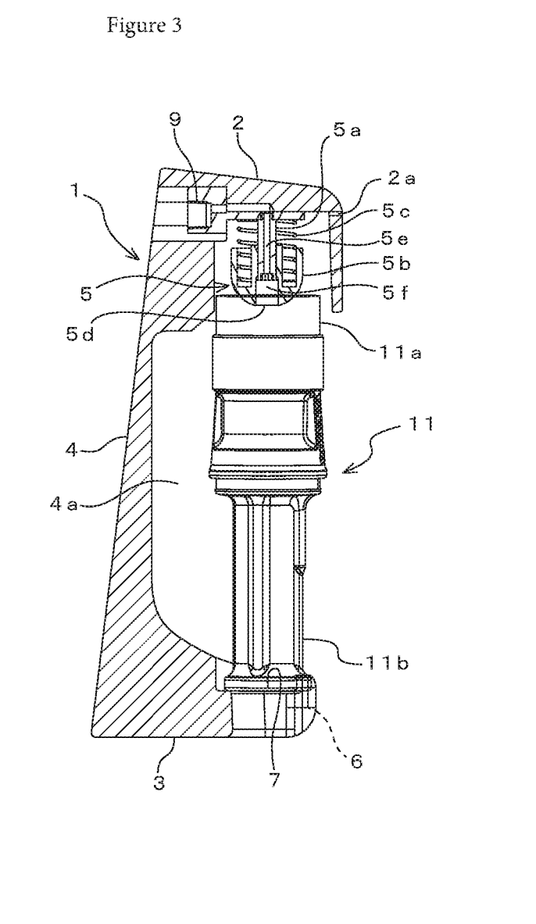
FIG. 3 is a longitudinally cross-sectional view showing a state where the filling nozzle is hung on the nozzle hanger in FIGS. 2(a) and 2(b).

The nozzle hanger 1 roughly includes, as shown in FIGS. 2(a), 2(b) and 3, an upper part 2 for holding a filling pipe 11a of the filling nozzle 11, and a lower part 3 for holding a grip section 11b of the filling nozzle 11, and an intermediate part 4 for connecting the upper part 2 and the lower part 3.

The upper part 2 is provided with a movable lock section 5 for locking the filling pipe 11a of the filling nozzle 11. The movable lock section 5 is composed of a shaft member 5a vertically extending; a main body 5b slidable on a surface of the shaft member 5a and formed in a spherical shape that protrudes downward; and a spring 5c for biasing the main body 5b downward. In addition, since a slight amount of hydrogen gas, which is discharged from the filling pipe 11a of the filling nozzle 11, stays in the upper part 2, the upper part 2 has a though hole 2a for drawing the hydrogen gas.

The shaft member 5a and the main body 5b are provided with through holes 5e, 5f at central portions thereof respectively, and the through holes 5e, 5f are in communication with inside of the compressed air carrier pipe 9. With this, injecting a compressed air (dry gas) toward the filling pipe 11a from the gas outlet 5d of the main body 5b through the compressed air carrier pipe 9 and the shaft member 5a from a compressed air source allows water droplets, frozen material and dust adhered to the filling pipe 11a to be removed. Here, the main body 5b of the movable lock section 5 is formed in a spherical shape that protrudes downward, and an end of the filling pipe 11a is formed to be spherical recess, so that the gas outlet 5d positions in the recessed portion of the filling pipe 11a, efficiently removing frozen material and so on adhered to the filling pipe 11a.

The lower part 3 is provided with a recessed section 6 that is formed to be U shape observed from the bottom to avoid the filling hose 13 that is connected to a lower end of the grip section 11b of the filling nozzle 11, and the recessed section 6 is provided with a stepped section 7 for locking a lower end of the grip section 11b. The stepped section 7 is about 10 mm in height for instance and is provided with a nozzle switch 8 that turns ON when pressed with the lower end of the grip section 11b.

The intermediate part 4 connects the upper part 2 and the lower part 3 while forming a space 4a for hanging and removing the filling nozzle 11 in a state that the filling nozzle 11 is grasped with both hands.

Figure 4A:
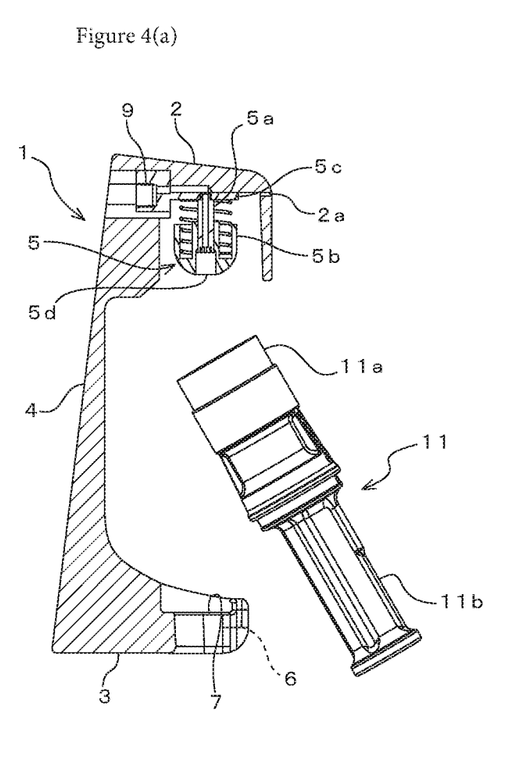
FIGS. 4(a), 4(b) and 4(c) are cross-sectional views for explaining the motion of hanging the filling nozzle on the nozzle hanger in FIG. 3.
Figure 4B:
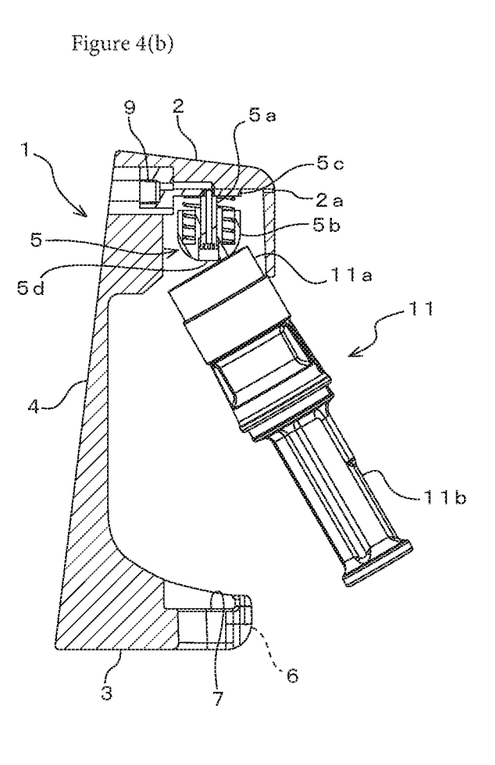
Figure 4C:
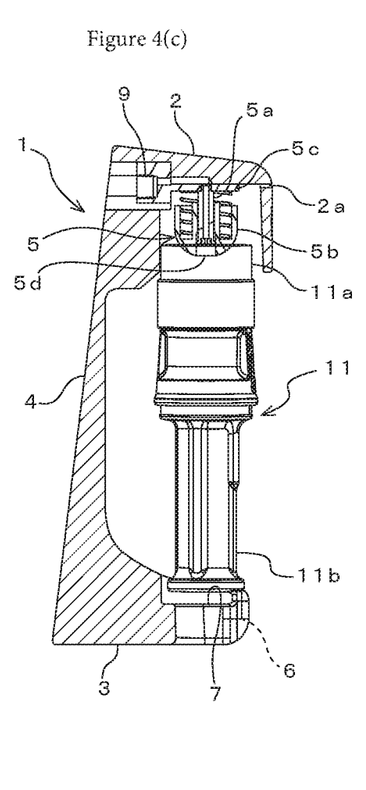

Next, the motion of hanging the filling nozzle 11 on the nozzle hanger 1 with the above construction will be explained with reference to FIGS. 4(a), 4(b) and 4(c). In FIGS. 3 and 4(a), 4(b) and 4(c), hands of a filler who performs gas filling and the filling hose 13 connected to the lower end portion of the filling nozzle 11 are omitted.

The gas filler, who grasps the grip section 11b of the filling nozzle 11 with both hands, as shown in FIG. 4(a), inserts the filling pipe 11a into a space in front of the intermediate part 4 of the nozzle hanger 1 while tilting the filling nozzle 11. Then, from that state, the filling nozzle 11 is raised, and as shown in FIG. 4(b), the filling pipe 11a is inserted below the upper part 2 in such a manner that the movable lock section 5 is pressed upward with the filling pipe 11a.

In a state that the movable lock section 5 is pressed upward with the filling pipe 11a, moving the grip section 11b of the filling nozzle 11 forward (leftward in the figure) causes the state shown in FIG. 4(c). In this state, the grip section 11b of the filling nozzle 11 is not yet accommodated in the recessed section 6 of the lower part 3, and is mounted on the upper face of the stepped section 7. Then, the grip section 11b is moved further forward, as shown in FIG. 3, the lower end portion of the grip section 11b of the filling nozzle 11 is locked by the stepped section 7 under the condition that the lower end portion of the grip section 11b of the filling nozzle 11 is accommodated in the recessed section 6.

After the grip section 11b is locked to the stepped section 7, releasing worker's hands from the grip section 11b only allows the main body 5b of the movable lock section 5 to be biased with the spring 5c, so that as shown in FIG. 3, the filling pipe 11a is locked to the main body 5b of the movable lock section 5, and the filling nozzle 11 is held on the nozzle hanger 1 while being biased downward.

As described above, with this embodiment, the upper part 2, the lower part 3 and the intermediate part 4 are integrated as a single member, so that no manufacturing error nor mounting error of these parts generates, which makes a dimensional error between the filling nozzle 11 and the nozzle hanger 1 considerably small. With this, dropout of the filling nozzle 11 from the nozzle hanger 1 and the like can certainly be prevented.

In addition, the locking of the grip section 11b of the filling nozzle 11 to the stepped section 7 and the locking of the filling pipe 11a to the movable lock section 5 can be performed in a single operation.

Further, biasing the filling nozzle 11 downward with the spring 5c prevents dropout of the filling nozzle 11 from the nozzle hanger 1 even though the height of the stepped section 7 is approximately 10 mm, which reduces burden to the filler.

Meanwhile, when pre-cooling filling and the like is carried out as described above, the filling nozzle 11 may be frozen. To avoid this, as shown in FIGS. 3 and 4, a compressed air supplied from the compressed air carrier pipe 9 should be injected to the filling nozzle 11 from the gas outlet 5d of the movable lock section 5. The motion of the injection of the compressed air will be explained with reference to FIGS. 3 and 5 in detail.

Figure 5:
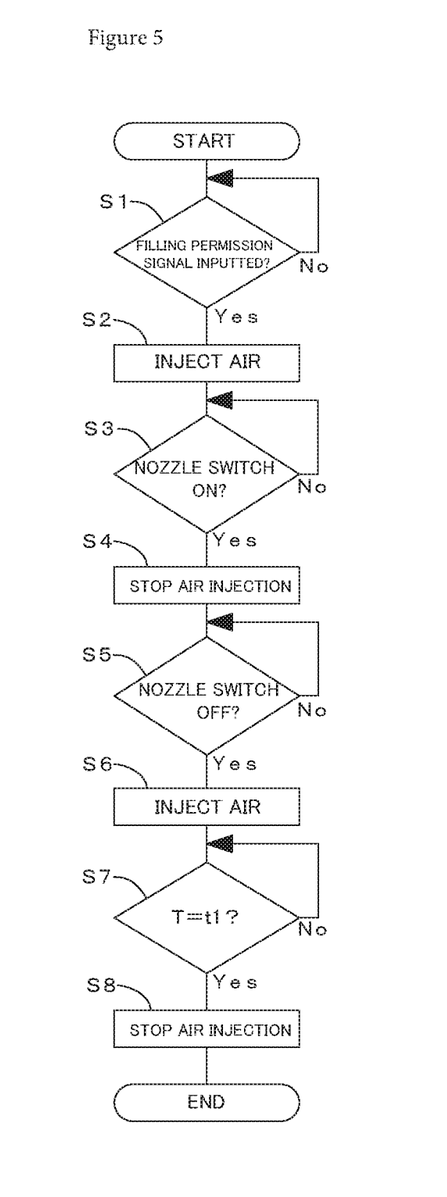
FIG. 5 is a flowchart for explaining the motion of injecting compressed air from a movable locking part shown in FIGS. 3 and 4 to the filling nozzle.

When a filling permission signal enters the nozzle hanger 1 from a host device such as a POS terminal (Step 1; Yes), a compressed air is injected to the filling nozzle 11 from the gas outlet 5*d* of the movable lock section 5 (Step 2), and when the nozzle switch 8 turns on (Step 3; Yes), the injection of the compressed air stops (Step 4).

Steps S1 to S4 allow the filling nozzle 11 to easily be removed from the nozzle hanger 1 and the filling pipe 11*a* of the filling nozzle 11 to easily be connected to a filling port of a vehicle.

When the filling is finished and the nozzle switch 8 turns off (Step 5; Yes), a compressed air is injected to the filling nozzle 11 from the gas outlet 5*d* (Step 6), and when a time T after the injection of the compressed air reaches a predetermined time t1 (ten seconds for instance) (Step 7; Yes), the injection of the compressed air stops (Step 8).

Steps S5 to S8 allow frozen water droplets and the like adhered to the filling nozzle 11 to be removed for the next filling.

Figure 6A:
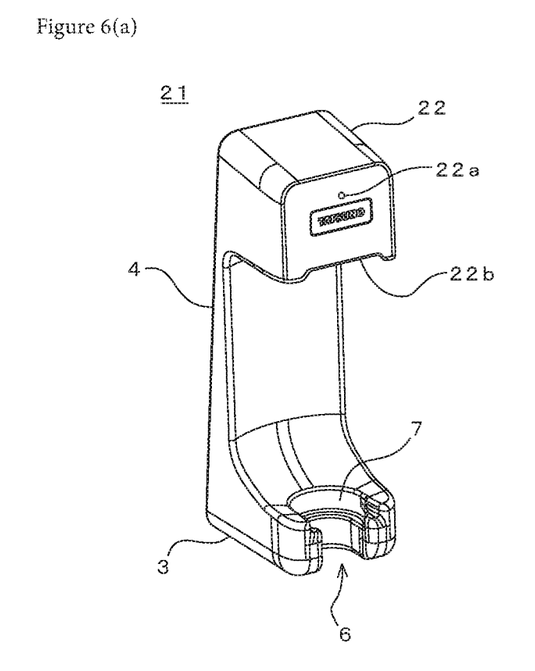
Figure 6B:
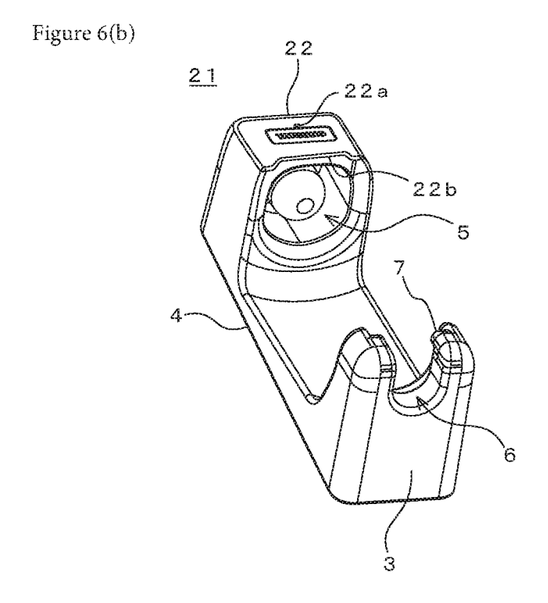
FIG. 6(b) is a perspective view as viewed obliquely from the lower left, of a nozzle hanger according to the second embodiment of the present invention.

Next, a nozzle hanger according to the second embodiment of the present invention will be explained with reference to FIGS. 6(*a*) and 6(*b*).

The nozzle hanger 21 is different from the nozzle hanger 1 described above in that a recessed section 22*b* is formed on an upper part 22. With the recessed section 22*b*, it becomes easier for a gas filler to insert the filling pipe 11*a* into a space in front of the intermediate part 4 while tilting the filling nozzle 11 (refer to FIGS. 4(*a*), 4(*b*) and 4(*c*)), after that, it becomes easier to raise the filling nozzle 11 and insert the filling pipe 11*a* below the upper part 22. In comparison to the nozzle hanger 1, it becomes possible to more easily hang the filling nozzle 11 (refer to FIG. 3 and so on) on the nozzle hanger 21. In addition, on the upper part 22, a through hole 22*a* for removing a stayed hydrogen gas is drilled. In FIGS. 6(*a*) and 6(*b*), the same reference numerals are attached to the same components as those of the nozzle hanger 1, and explanations thereof are omitted.

In the above embodiments, although the spring 5*c* is mounted to the movable lock section 5 as means for biasing the main body 5*b* downward, the spring 5*c* is not always mounted, and the filling nozzle 11 can be held with the movable lock section 5, the recessed section 6 and the stepped section 7 without biasing the main body 5*b* downward.

In addition, the position, the shape and others of the movable lock section 5 are not limited to those shown the drawings. Provided it has a fixed lock section of the lower part 3 for locking the grip section 11*b* of the filling nozzle 11 in a fixed state and a movable lock section for contacting the filling pipe 11*a* of the filling nozzle 11 and for locking the filling pipe 11*a* in a movable state, any construction can be adopted.

Further, although the nozzle switch 8 is mounted to the lower part 3 of the nozzle hanger 1, it may be mounted to the upper part 2 or the movable lock section 5. From the gas outlet 5*d* can be injected an inert gas in place of the compressed air (dry gas).

DESCRIPTION OF THE REFERENCE NUMERALS

1 nozzle hanger
2 upper part
2*a* though hole
3 lower part
4 intermediate part
5 movable lock section
5*a* shaft member
5*b* main body
5*c* spring
5*d* gas outlet
5*e*, 5*f* though holes
6 recessed section
7 stepped section
8 nozzle switch
9 compressed air carrier pipe
10 gas filling apparatus
11 filling nozzle
11*a* filling pipe
11*b* grip section
13 filling hose
21 nozzle hanger
22 upper part
22*a* though hole
22*b* recessed section

The invention claimed is:

1. A nozzle hanger for hanging a filling nozzle, of which one end has a filling pipe for filling a hydrogen gas and another end has a grip section comprising:
    an upper part configured for holding the filling pipe of the filling nozzle;
    a lower part facing the upper part and configured for holding the grip section of the filling nozzle; and
    a shaft;
    wherein said lower part includes a fixed lock section configured for locking the grip section of the filling nozzle in a fixed state, and said upper part includes a recessed section to facilitate insertion of the filling pipe of the filling nozzle tilted into a space in front of an intermediate part and a movable lock section for contacting the filling pipe and locking the filling pipe in a movable state;
    wherein said movable lock section is formed in a spherical shape that protrudes downward, and a gas outlet is provided in a central region thereof;
    the shaft operatively interfacing with the moveable lock section, the shaft and moveable lock section being configured to facilitate slidable movement of the moveable lock section along the shaft.

2. The nozzle hanger as claimed in claim 1, wherein said movable lock section includes biasing means for biasing the filling pipe downward when the filling nozzle is hung on the nozzle hanger.

3. The nozzle hanger as claimed in claim 2, wherein a gap more than a predetermined size is formed between the intermediate part and a side face of the filling nozzle when the filling nozzle is hung on the nozzle hanger.

4. The nozzle hanger as claimed in claim 2, wherein said fixed lock section includes a recessed section in which the grip section of the filling nozzle is accommodated, and a stepped section projecting upward from the recessed section and locking the grip section.

5. The nozzle hanger as claimed in claim 1, wherein a gap more than a predetermined size is formed between the intermediate part and a side face of the filling nozzle when the filling nozzle is hung on the nozzle hanger.

6. The nozzle hanger as claimed in claim 5, wherein said fixed lock section includes a recessed section in which the grip section of the filling nozzle is accommodated, and a stepped section projecting upward from the recessed section and locking the grip section.

7. The nozzle hanger as claimed in claim 1, wherein said fixed lock section includes a recessed section in which the grip section of the filling nozzle is accommodated, and a stepped section projecting upward from the recessed section and locking the grip section.

8. The nozzle hanger as claimed in claim 1, further comprising an internal flow passage extending within, and defined by, the upper part, the internal flow passage being configured to deliver fluid to the moveable lock section.

9. The nozzle hanger as claimed in claim 8, wherein the internal flow passage is of a fixed configuration.

10. A nozzle hanger for hanging a filling nozzle, of which one end has a filling pipe for filling a hydrogen gas and another end has a grip section comprising:
   an upper part configured for holding the filling pipe of the filling nozzle;
   a lower part facing the upper part and configured for holding the grip section of the filling nozzle; and
   wherein said lower part includes a fixed lock section configured for locking the grip section of the filling nozzle in a fixed state, and said upper part includes a recessed section to facilitate insertion of the filling pipe of the filling nozzle tilted into a space in front of an intermediate part, a shaft, and a movable main body for contacting the filling pipe and locking the filling pipe in a movable state, the moveable main body being slidable on the shaft;
   wherein said movable lock section is formed in a spherical shape that protrudes downward, and a gas outlet is provided in a central region thereof.

11. The nozzle hanger as claimed in claim 10, further comprising an internal flow passage extending within, and defined by, the upper part, the internal flow passage being configured to deliver fluid to the moveable lock section.

12. The nozzle hanger as claimed in claim 11, wherein the internal flow passage is of a fixed configuration.

* * * * *